United States Patent
St-Denis et al.

(10) Patent No.: US 11,637,784 B2
(45) Date of Patent: Apr. 25, 2023

(54) METHOD AND SYSTEM FOR EFFECTIVE USE OF INTERNAL AND EXTERNAL MEMORY FOR PACKET BUFFERING WITHIN A NETWORK DEVICE

(71) Applicant: NXP USA, Inc., Austin, TX (US)

(72) Inventors: Bernard Francois St-Denis, Ottawa (CA); John Pillar, Ottawa (CA); Allen Lengacher, Ottawa (CA)

(73) Assignee: NXP USA, Inc., Austin, TX (US)

( * ) Notice: Subject to any disclaimer, the term of this patent is extended or adjusted under 35 U.S.C. 154(b) by 24 days.

(21) Appl. No.: 17/219,877

(22) Filed: Mar. 31, 2021

(65) Prior Publication Data

US 2022/0321489 A1 Oct. 6, 2022

(51) Int. Cl.
*H04L 47/30* (2022.01)
*H04L 47/10* (2022.01)
*H04L 47/6275* (2022.01)
*H04L 49/00* (2022.01)
*H04L 49/90* (2022.01)
*H04L 47/193* (2022.01)

(52) U.S. Cl.
CPC ............ *H04L 47/30* (2013.01); *H04L 47/193* (2013.01); *H04L 47/29* (2013.01); *H04L 47/6275* (2013.01); *H04L 49/3018* (2013.01); *H04L 49/3027* (2013.01); *H04L 49/9084* (2013.01)

(58) Field of Classification Search
CPC ......... H04L 47/30; H04L 47/50; H04L 47/52; H04L 47/525; H04L 47/6255; H04L 47/6265; H04L 47/627; H04L 47/193; H04L 47/29; H04L 47/6275; H04L 49/3018; H04L 49/3027; H04L 49/9005; H04L 49/9084; H04L 49/9089; H04L 1/1835; H04L 1/1854; H04L 1/1874; H04L 1/1887; H04L 2012/5681; H04L 2012/5682; H04L 2012/6489
See application file for complete search history.

(56) References Cited

U.S. PATENT DOCUMENTS 6,904,474 B1 * 6/2005 Robertson ............... G06F 15/17
710/316
6,977,940 B1 * 12/2005 Ahlfors ................. H04L 49/108
370/417
9,455,913 B2    9/2016 Naaman et al.
(Continued)

OTHER PUBLICATIONS

European Search Report; Application No. 22 162 054.5; dated Aug. 19, 2022; p. 8 (Year: 2022).*

*Primary Examiner* — Joshua Kading (57) ABSTRACT

A mechanism is provided to maximize utilization of internal memory for packet queuing in network devices, while providing an effective use of both internal and external memory to achieve high performance, high buffering scalability, and minimizing power utilization. Embodiments initially store packet data received by the network device in queues supported by an internal memory. If internal memory utilization crosses a predetermined threshold, a background task performs memory reclamation by determining those queued packets that should be targeted for transfer to an external memory. Those selected queued packets are transferred to external memory and the internal memory is freed. Once the internal memory consumption drops below a threshold, the reclamation task stops.

20 Claims, 5 Drawing Sheets

(56) References Cited

U.S. PATENT DOCUMENTS

| | | | |
|---|---|---|---|
| 2002/0031090 A1 | 3/2002 | Kadambi et al. | |
| 2002/0176430 A1* | 11/2002 | Sangha | H04L 49/90 370/395.7 |
| 2003/0223447 A1* | 12/2003 | Saxena | H04L 49/901 370/428 |
| 2005/0053077 A1* | 3/2005 | Blanc | H04L 49/103 370/395.72 |
| 2008/0247409 A1 | 10/2008 | Choudhury et al. | |
| 2013/0230054 A1* | 9/2013 | Gilat | H04L 49/9078 370/401 |
| 2013/0315259 A1* | 11/2013 | Boden | H04L 49/9084 370/412 |
| 2014/0233383 A1 | 8/2014 | Naaman et al. | |
| 2015/0215226 A1* | 7/2015 | Peled | H04L 47/521 370/412 |
| 2017/0150242 A1* | 5/2017 | Koren | H04L 49/9078 |
| 2017/0289048 A1* | 10/2017 | Chao | H04L 43/0864 |
| 2019/0052566 A1* | 2/2019 | Leib | H04L 47/12 |
| 2019/0158414 A1* | 5/2019 | Navon | H04L 47/52 |
| 2020/0344167 A1* | 10/2020 | Sweeney | H04L 49/9078 |
| 2021/0297354 A1* | 9/2021 | Zemach | H04L 47/122 |

\* cited by examiner

METHOD AND SYSTEM FOR EFFECTIVE USE OF INTERNAL AND EXTERNAL MEMORY FOR PACKET BUFFERING WITHIN A NETWORK DEVICE

BACKGROUND

Field

This disclosure relates generally to packet buffering in a network device, and more specifically, to a mechanism for maximizing use of packet processor internal memory for packet buffering, while both minimizing use of external memory and effectively using both internal and external memories to provide high performance, low power consumption, and high buffering scalability.

Related Art

In network devices that provide queueing, there is a trade-off on the amount of buffering required at various queuing points. Multiple network strategies are utilized to minimize the amount of queuing to reduce jitter and latency for data traffic in order to enhance a user's Quality of Experience. But there are multiple scenarios, such as transmission over a shared resource such as air (e.g., WiFi, 3G, LTE, 5G, and the like) or fiber (e.g., passive optical networks (PON) such as gigabit passive optical network [GPON], 10 gigabit, symmetrical PON [XGS-PON], next-generation PON [NG-PON], ethernet PON [EPON], and the like), where queueing memory requirements can be very high and difficult to predict.

Equipment vendors always strive to minimize power and cost while increasing performance. While memory external to a packet processor (e.g., DDR memory) is inexpensive and scalable, external memory has a high-power utilization cost and lower performance when such memory is accessed relative to processor internal memory. On the other hand, such internal memory is expensive and not very scalable for the cost but has low power utilization and higher performance.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments of the present invention provide a mechanism to maximize utilization of internal memory for packet queuing in network devices, while providing an effective use of both internal and external memory to achieve high performance, high buffering scalability, and minimizing power utilization. Embodiments initially store packet data received by the network device in queues supported by an internal memory. If internal memory utilization crosses a predetermined threshold, a background task performs memory reclamation by determining those queued packets that should be targeted for transfer to an external memory. Those selected queued packets are transferred to external memory and the internal memory is freed. Once the internal memory consumption drops below a threshold, the reclamation task stops. Embodiments provide low power consumption because while the internal memory consumption is below the threshold, the power consumption is lowest possible (e.g., just internal memory utilization). When the internal memory is fully utilized for buffering, and external memory is utilized for some queue storage, the power consumption is lower than a standard solution that stores all queued packet data in an external memory.

Typical network devices, such as routers, switches, and optical network units (ONUs) receive network data packets at a network interface, process those packets to determine a destination or otherwise modify the packet, and then transmit the packet from an egress network interface. Upon receiving the data packets, the network device stores the contents of the data packets in a job queue and then, upon processing, can store the contents of the processed data packet in a queue associated with an egress port related to the egress network interface while waiting for availability of the egress network. For speed and low power consumption, memory that is internal to the processor of the network device can be used to store the data packet queues. But such memory is limited and is not generally scalable. Memory external to the processor, such as DDR memory, can be used to provide scalability, but such external memory carries both a speed and power consumption penalty, and thus is not as desirable to use. Embodiments of the present invention provide a mechanism that uses both the internal memory and the external memory for packet queuing, thereby providing both speed, low power consumption, and scalability.

Figure 1:
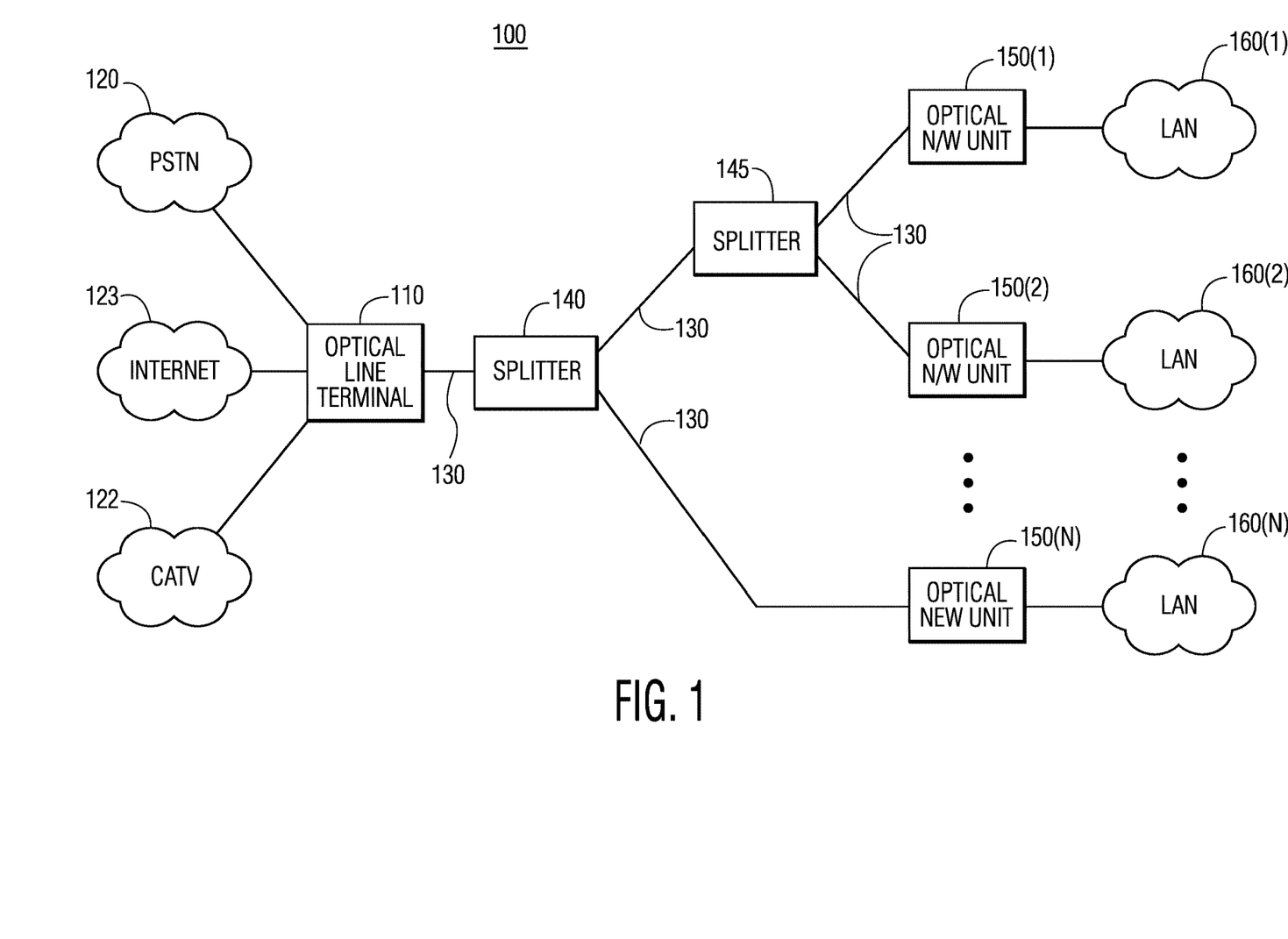
FIG. 1 is a simplified block diagram illustrating an example network environment having network devices that can incorporate embodiments of the present invention.

FIG. 1 is a simplified block diagram illustrating an example network environment 100 having network devices that can incorporate embodiments of the present invention. The illustrated network environment is a passive optical network (PON) including an optical line terminal (OLT) 110 that is configured to interface between a set of networks, such as, for example, a public switched telephone network (PSTN) 120, a wide-area network such as the Internet 123, and a cable television network (CATV) 127, and an optical distribution network (ODN) that includes fiber optic cables 130, and passive optical splitters 140 and 145. Providing data to the consumers of the ODN (e.g., LANs 160(1)-(N)) are a set of optical network units (ONUs) 150(1)-(N). Network nodes that provide packet traffic to and from the ODN (e.g., OLT 110 and ONU 150(1)-(N)) provide switch processing of packets by determining whether a packet destination is on an associated network and on which input/output (I/O) ports of the network node the packet destination may be located. Differing data rates of LANs 160(1)-(N) as compared with the ODN can result in congestion of data in the queues associated with the I/O ports coupled to those networks. As will be discussed more fully below, memory storing those port queues can require management subsequent to storing packet data on those queues should the queues suffer significant congestion.

It should be noted that while an ODN is used as an example of a network having devices that can incorporate embodiments of the present invention, other networks having differing line rate limitations can also have network devices incorporating embodiments of the present invention (e.g., WiFi, 3G, 5G, ethernet, and the like).

Figure 2:
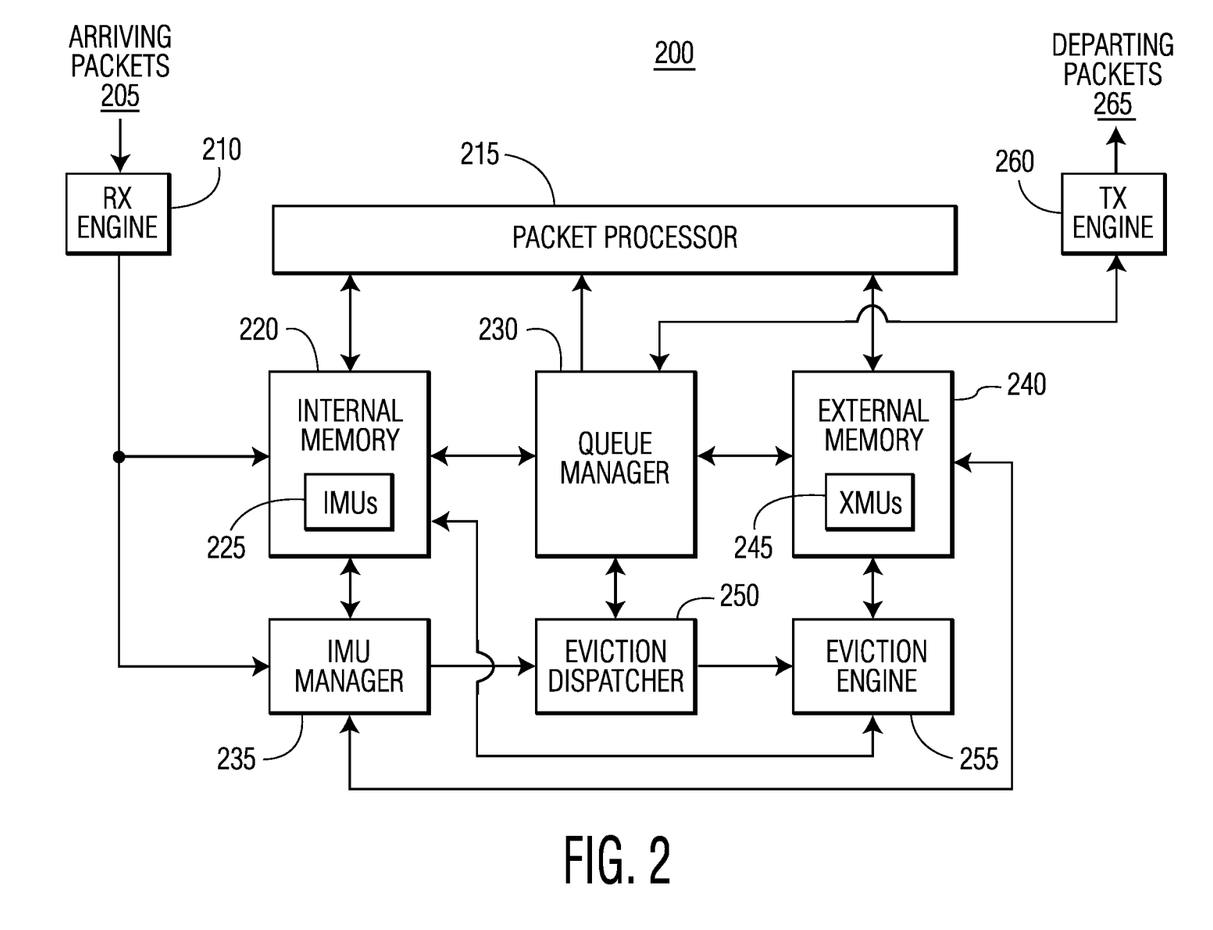
FIG. 2 is a simplified functional block diagram of a network node configured to implement embodiments of the present invention.

FIG. 2 is a simplified functional block diagram of a network node 200 (e.g., ONU 150(1)-(N)) configured to implement embodiments of the present invention. Arriving network packets 205 arrive at network node 200 at a receive engine 210. The receive engine can include interfaces to various media access control (MAC) clients (e.g., ethernet, GPON, NG-PON2, XG-PON, and the like). The receive engine is configured to receive an incoming data stream, reconstruct packets that are members of the data stream, and store those packets into internal memory 220. The packet information is stored as members of queues that are stored using internal memory units (IMUs) 225. An IMU is a fixed size memory unit (e.g., 20 bytes). IMU manager 235 manages a pool of IMUs 225. IMU management includes, for example, receiving requests from client processes to acquire (e.g., when assembling a packet) and release (e.g., subsequent to transmission and eviction to the external memory) the IMUs.

A queue stored in internal memory 220 includes a linked list of packets (also known as frame descriptors), where each packet is stored as a set of IMUs. As will be discussed more fully below, the queue memory is managed by queue manager 230.

Once stored, packets are made available to packet processor 215 for processing tasks. Such processing tasks can include, for example, determining an egress port and associated egress queue for the packet and performing forwarding actions associated with the egress queue; determining a quality of service (QoS) associated with the packet; performing access control list (ACL) operations; performing multicast operations; and the like.

In addition to allocating memory for received packets, IMU manager 235 monitors memory consumption in internal memory 220 to determine if the memory is becoming depleted (e.g., approaching or exceeding a predetermined threshold value). If the memory is becoming depleted, then IMU manager 235 can inform eviction dispatcher 250 of the depletion (e.g., providing an IMU depletion event). In some embodiments, IMU manager 235 can also manage allocation and recovery of external memory units 245 in external memory 240.

As will be discussed in greater detail below, eviction dispatcher 250 can work with queue manager 230 to decide which queue stored in internal memory 220 is a candidate for moving some or all of the queue's contents to an external memory 240. Once a candidate queue is identified, the eviction dispatcher informs eviction engine 255 which moves stored packets from IMUs 220 to external memory units (XMUs) 245 in external memory 240. During this process, queue manager 230 can modify the identity of the packets in the queues to reflect the movement of the packet data from internal memory to external memory. When the egress port is ready to transmit the packet, queue manager 230 schedules a packet for transmission from a queue and notifies the transmit engine 260. After the transmit engine transmits the packet, the packet's memory, either a set of IMUs or XMUs, is released to the IMU manager.

Figure 3:
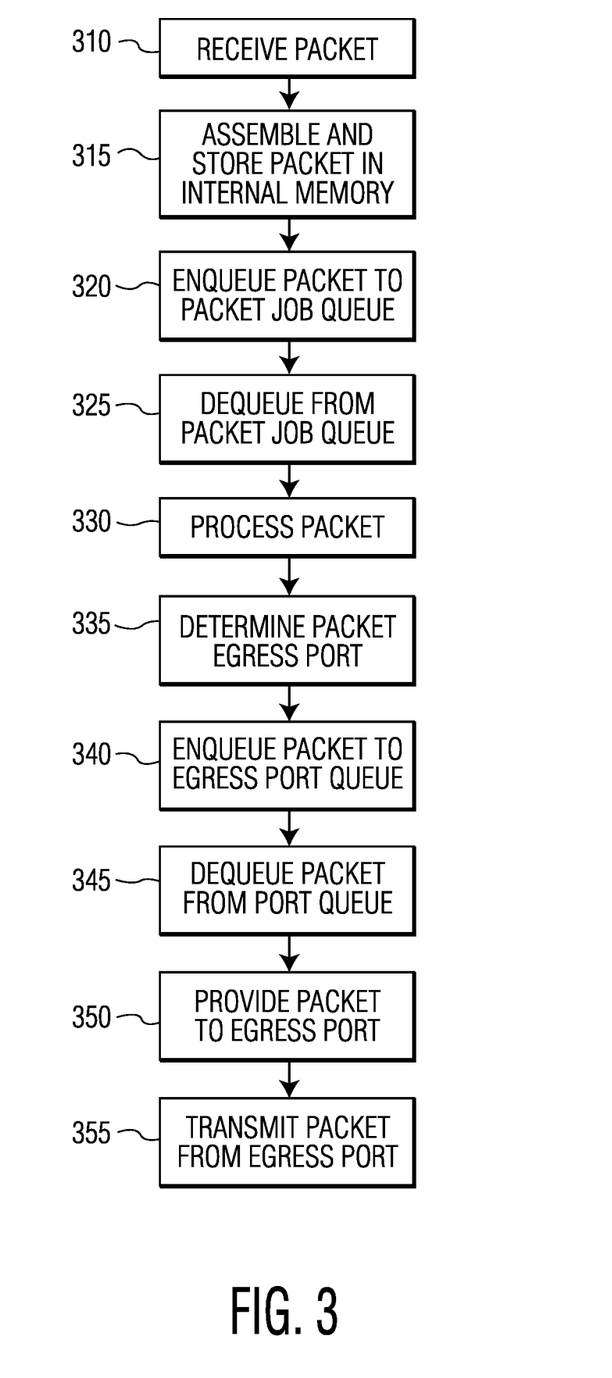
FIG. 3 is a simplified flow diagram illustrating an example process performed in data path flow of a network node, in accordance with embodiments of the present invention.

FIG. 3 is a simplified flow diagram illustrating an example process performed in data path flow 300 of a network node 200, in accordance with embodiments of the present invention. A network packet (e.g., arriving packets 205) is received at an ingress port (e.g., receive engine 210) (310). The network packet is assembled and stored in an internal memory 220 (315) as a set of IMUs and enqueued to a packet job queue (320). When packet processor 215 is ready to process the packet, the packet is dequeued from the packet job queue (325) and then the processor performs packet processing (330). During packet processing, the processor determines the packet egress port (335) from which to send the packet along to the packet's destination and enqueues the packet to an egress port queue (340). When the egress port is ready to transmit the packet, the packet is dequeued from the port queue (345) and then provided to the egress port (350). The packet is then transmitted by a transmit engine 260 at the egress port as a departing packet 265 (355). Once transmitted, the packet memory (e.g., the set of IMUs) is released by, for example, the IMU manager.

Initially, the queued packet data is stored as a set of IMUs 225. As will be discussed in below, the packet data can be moved from a set of IMUs 225 to a set of XMUs 245 prior to transmission from the egress port if internal memory 220 reaches a threshold capacity. Movement of the packet data from internal memory to external memory allows higher priority packets, which will soon be scheduled for transmission, to remain in quickly accessible internal memory, while providing a large, relatively inexpensive external memory store for lower priority packets, which will take a longer time to be scheduled for transmission.

Figure 4:
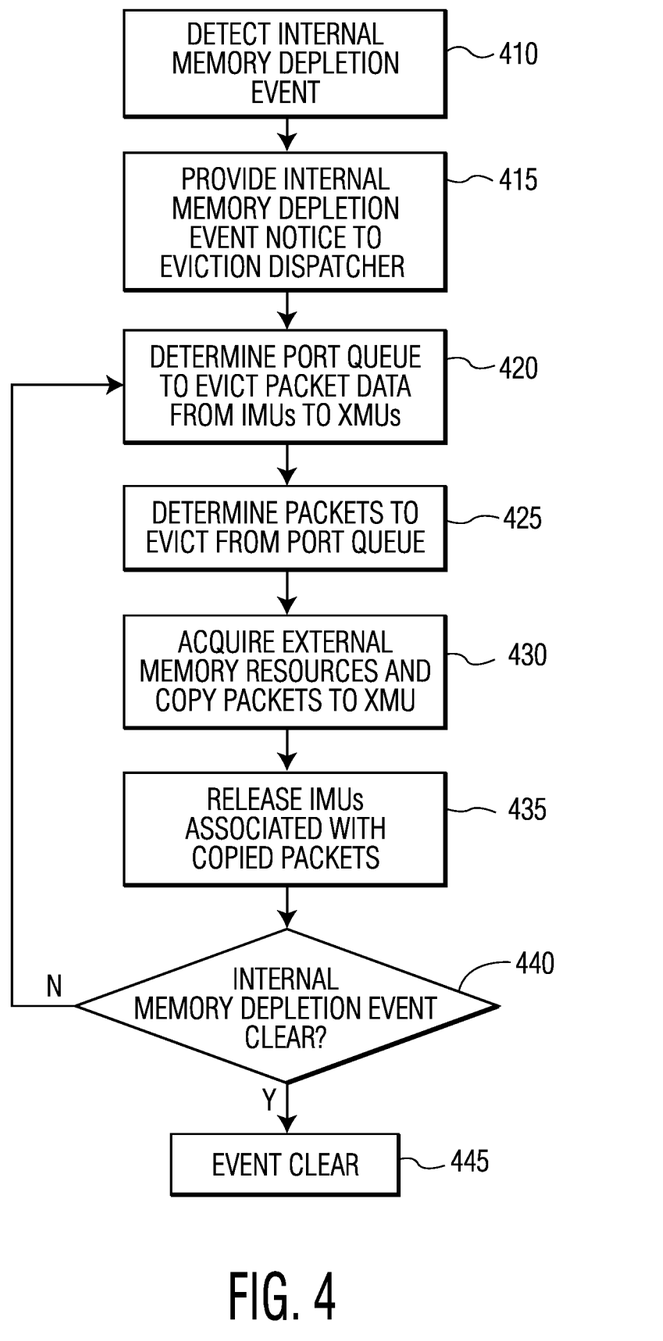
FIG. 4 is a simplified flow diagram illustrating an example process performed in packet eviction flow of a network node, in accordance with embodiments of the present invention.

FIG. 4 is a simplified flow diagram illustrating an example process performed in packet eviction flow 400 of a network node 200, in accordance with embodiments of the present invention. IMU manager 235 monitors internal memory 220 for resource consumption and depletion. Packet eviction flow begins when the IMU manager detects a memory depletion event occurring in the internal memory (410). The memory depletion event can occur when the internal memory approaches a predetermined threshold of capacity (e.g., 90% capacity). The IMU manager informs eviction dispatcher 250 of the depletion event (415). The eviction dispatcher then works with queue manager 230 to determine an egress port queue from which to evict one or more packets to XMUs 245 (420). A process for determining a queue from which to evict packets is described more fully below with regard to FIG. 5.

Once a port queue is selected for eviction, the eviction dispatcher coordinates with the queue manager to determine which packets from that queue should be evicted from the internal memory to bring internal memory capacity down below a threshold value (425). This second threshold value may not be the same as that used to trigger eviction. The eviction engine then can acquire external memory resources (e.g., XMUs) for storage of packets, as those packets are being selected, and can copy the packet data from IMUs to the XMUs (430). This can be performed concurrently with the decision-making process for selecting the packets to evict, since the copying process can take longer than the selection process. During the selection and copying process, the identity of the queue entries can be modified to indicate that the data for the queue entry is moved or about to be moved to the external memory. Once the packet data is moved from IMUs to XMUs by the eviction engine, then the eviction engine releases the IMUs (435). If the internal memory depletion event is not cleared after removing the selected packets from the selected queue (440), then the process can continue with a selection of another queue from which to remove packets. Otherwise, if the event is clear (445), the process is complete until another internal memory depletion event is triggered.

Each egress port is allocated a set of queues. Embodiments of the present invention select queues from which to evict packet data from internal memory to external memory by determining which port to attack. For example, selection can be based upon the amount of time it may take to transmit all frames queued to that port. Once a port is chosen, then a queue associated with that port is selected (e.g., the lowest priority queue). An additional factor for queue selection is the amount of data (e.g., the number of bytes) stored in the queues associated with the selected port. For example, a port using a largest amount of IMUs is most eligible for selection of eviction of packet data to XMUs. Once a port is selected, a queue within that port is selected for eviction.

Figure 5:
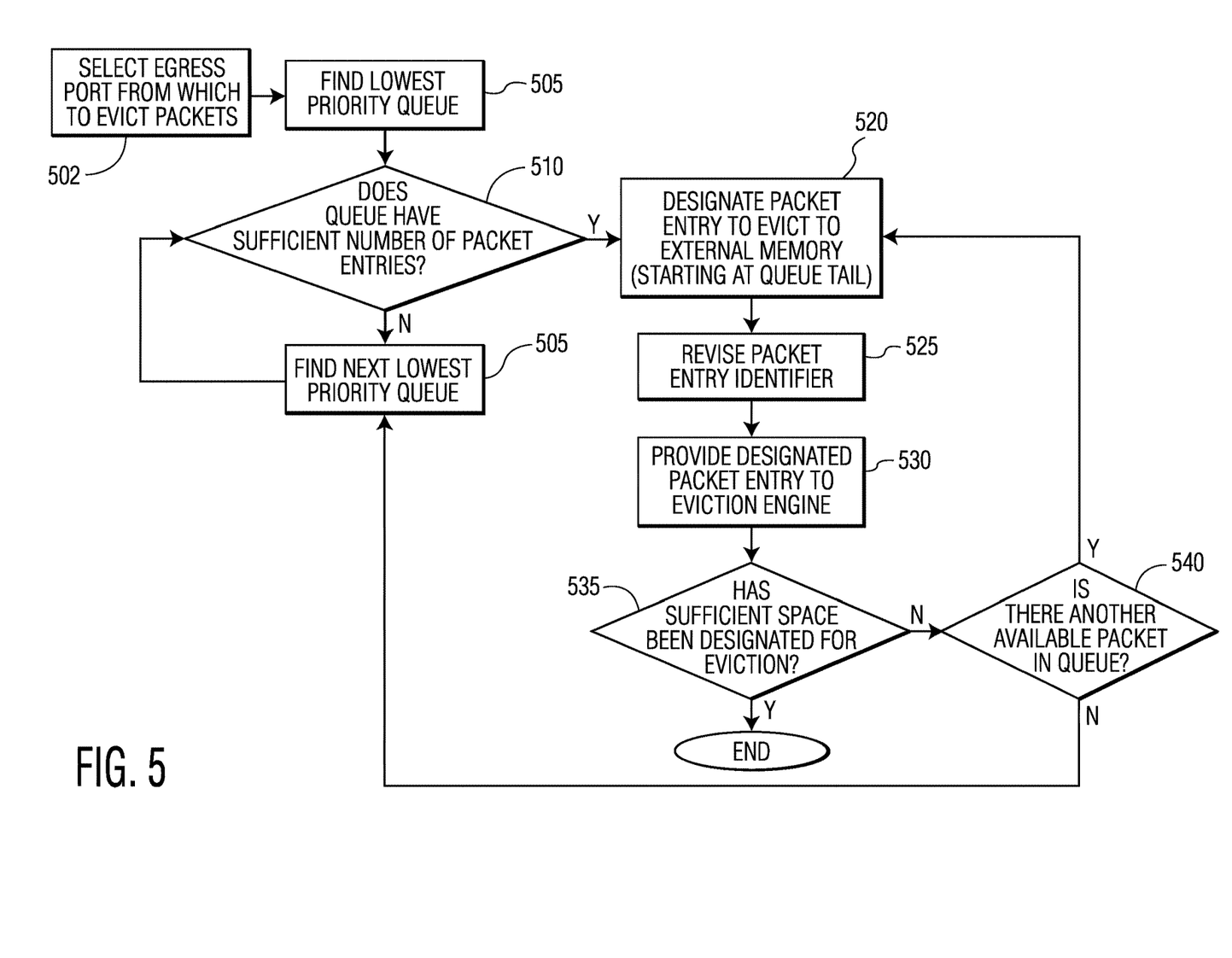
FIG. 5 is a simplified flow diagram illustrating an example of a process performed to select a queue from which to evict packets as part of the eviction flow illustrated in FIG. 4, in accordance with embodiments of the present invention.

FIG. 5 is a simplified flow diagram illustrating an example of a process performed to select a queue from which to evict packets as part of the eviction flow illustrated in FIG. 4, in accordance with embodiments of the present invention. This process can be performed by the eviction dispatcher, the queue manager, or the eviction manager in conjunction with the queue manager. As discussed above, an egress port is selected from which to evict packets waiting for transmission (502). Selection criteria can include, for example, comparing a length of time that it would take to transmit all frames queued for the egress ports. Once an egress port is selected, the queue manager can find a lowest priority queue associated with the selected egress ports of the network node (505). While embodiments are discussed using priority of the queue for selection, other factors can enter into consideration for queue selection. For example, in light of internal memory eviction being a continuous process, a lowest priority queue may have previously had entries evicted from the internal memory. Thus, the entries remaining in the internal memory may be insufficient to reduce the internal memory capacity below the operating threshold. Since there is overhead in shifting from queue to queue for eviction, selecting a higher priority queue that has more entries residing in the internal memory can be more efficient than selecting a lower priority queue with an insufficient number of entries to reduce the IMU capacity sufficiently. So a determination is made as to whether the queue has a sufficient number of packet entries stored in the internal memory (510), where a sufficient number of entries is such that there is reduced hopping from queue to queue. If there is an insufficient number of entries, then a next lowest priority queue is found (515) and a similar evaluation is made as to whether there are sufficient entries stored in the internal memory (510).

Once a queue is selected to have packet entries evicted, a packet entry is designated to be moved to the external memory (520). Entries are chosen from the tail of the queue, since these are the entries likely to remain enqueued the longest before transmission. This also reduces the likelihood that an egress port will attempt to transmit the packet while the packet is in transition from IMUs to XMUs. When the packet is designated for eviction, the packet entry identifier can be revised to indicate that the packet data is stored in XMUs rather than IMUs (525). The designated packet entry information can then be provided to the eviction engine for moving the designated packet from the internal memory to the external memory (530). In this manner, the eviction engine can perform the slower task of packet copying while the process of designating packets for eviction can continue.

A determination can then be made as to whether more packets need to be moved to meet the congestion threshold (535). If not, then a determination is made as to whether there is another available packet in the selected queue (540). If not, then a next lowest priority queue is found (515) and the process continues. If there is another available packet, then then that packet is designated to be moved to the external memory (520). When sufficient space has been designated for eviction from the internal memory to the external memory (535), then the designation process can end.

As part of the process above, queued packets that have been moved can include a flag that they are resident in the external memory, beyond a change in the queue entry identifier. This flag can be used to accelerate the process for determining whether a queue contains sufficient entries stored in the IMU to be a candidate for the eviction designation process. If too many queue entries are flagged, then that queue can be skipped and another queue selected. In addition, as packet data is moved, the amount of IMUs in internal memory being used by the port is decremented accordingly. This updated amount can then be used by the eviction dispatcher as a port selection criteria for a subsequent eviction mission.

Embodiments of the present invention provide a mechanism by which packet processor internal memory can be optimally utilized to store higher priority, lower latency packets during processing and queuing for transmission, while lower priority, higher latency packets can be stored in lower cost, but higher power consumption external memory should availability of the internal memory become depleted.

By now it should be appreciated that there has been provided a method for storing and accessing queued packet data in a network device. The method includes detecting depletion of available memory space in an internal memory of the network device where the internal memory is associated with a packet processor, the internal memory stores network packet data from a plurality of network packets, and the network packet data is stored as entries of one or more egress packet queues. The method further includes selecting an egress packet queue from which to evict one or more associated packets from the internal memory, selecting one or more packets associated with the selected egress packet queue for evicting from the internal memory, copying the selected packets to an external memory coupled to the packet processor, releasing internal memory resources associated with the copied packets, and accessing an entry from an egress packet queue where packet data for the entry is retrieved from one of the internal memory or external memory in response to previously copying the selected packets to the external memory.

In one aspect of the above embodiment, detecting depletion of available memory space in the internal memory further includes determining that available memory space in the internal memory is below a predetermined threshold. In another aspect, selecting the egress packet queue further includes selecting an egress port from which to evict packets where a first subset of the one or more egress packet queues are associated with the egress port, finding a lowest priority egress packet queue of the first subset of the one or more egress packet queues, and determining whether the selected egress packet queue includes packet entries consuming a sufficient amount of data in the internal memory to increase the available memory space in the internal memory above a second predetermined threshold. In a further aspect, the method further includes finding a next lowest priority egress packet queue of the first subset of the one or more egress packet queues when the selected packet queue does not include packet entries consuming a sufficient amount of data in the internal memory to increase the available memory space in the internal memory above the second predetermined threshold.

In another aspect of the above embodiment, selecting one or more packets associated with the selected egress packet queue for evicting from the internal memory further includes sequentially selecting one or more most recently added packet entries in the egress packet queue, determining whether data associated with the selected packet entry is stored in the internal memory, designating the selected packet entry for eviction from the internal memory when the data associated with the selected packet entry is stored in the internal memory, tracking a total amount of internal memory space freed by the sequentially selected one or more packet entries, and concluding said sequentially selecting when the total amount of internal memory space freed is above a third threshold. In a further aspect, each packet entry includes a flag designating that the entry is stored in the internal memory. In another further aspect, designating the selected packet entry for eviction from the internal memory further includes revising and identifier associated with the selected packet entry.

In yet another aspect, the method further includes transmitting the accessed entry using an egress port of the network device associated with the egress packet queue. In still another aspect, the method further includes receiving a network packet of the plurality of network packets at an ingress port of the network device.

Another embodiment provides a network node configured to route network packets from an ingress network to one or more egress networks. The network node includes: a first network interface, coupled to the ingress network, and configured to receive a plurality of network packets from the ingress network; a second network second interface, coupled to a first egress network of the one or more egress networks, and configured to transmit a network packet of the plurality of network packets to the first egress network; and internal memory, coupled to a packet processor, and configured to store network packet data from the plurality of network packets in one or more egress packet queues; an internal memory unit manager (IMU manager), coupled to the internal memory, and configured to detect depletion of available memory space in the internal memory; an eviction dispatcher module coupled to the IMU manager and a queue manager module; and, an eviction engine module coupled to the internal memory and the eviction dispatcher module. The eviction dispatcher module is configured to select an egress packet queue from which to evict one or more associated packets from the internal memory where selecting the egress packet queue is performed in communication with the queue manager module, and configured to select one or more packets associated with the selected egress packet queue for evicting from the internal memory where selecting the one or more packets is performed in communication with the queue manager module. The eviction engine module is configured to receive identification of the selected one or more packets associated with the selected egress packet queue from the eviction dispatcher, release internal memory resources associated with the copied packets subsequent to said copying to the external memory where the second network interface accesses an entry from an egress packet queue and packet data for the entry is retrieved from one of the internal memory or the external memory in response to previously copying the selected packets to the external memory.

In one aspect of the above embodiment, the IMU manager detects depletion of available memory space in the internal memory by being further configured to determine that the available memory space in the internal memory is below a predetermined threshold. In another aspect of the above embodiment, the eviction dispatcher module is configured to select the egress packet queue by being further configured to select an egress port from which to evict packets where a first subset of the one or more egress packet queues are associated with the egress port, find a lowest priority egress packet queue of the first subset of the one or more egress packet queues, and determine whether the selected egress packet queue includes packet entries consuming a sufficient amount of data in the internal memory to increase the available memory space in the internal memory above a second predetermined threshold. In a further aspect, the eviction dispatcher module is further configured to find a next lowest priority egress packet queue of the first subset of the one or more egress packet queues when the selected packet queue does not include packet entries consuming a sufficient amount of data in the internal memory to increase the available memory space in the IMU above the second predetermined threshold.

In yet another aspect, the eviction dispatcher module selects one or more packets associated with the egress packet queue by being further configured to sequentially select one or more most recently added packet entries in the egress packet queue, determine whether data associated with the selected packet entry is stored in the internal memory, designate the selected packet entry for eviction from the internal memory when the data associated with the selected packet entry is stored in the internal memory, track a total amount of internal memory space freed by the sequentially selected one or more packet entries, and conclude sequentially selecting when the total amount of internal memory space freed is above a third threshold. In still another aspect, the most recently added packet entry includes a flag designating that the entry is stored in the internal memory. In yet another aspect, the eviction dispatcher module designates the selected packet entry for eviction from the internal memory by being further configured to revise an identifier associated with the selected packet entry.

In another aspect, the second network interface is configured to transmit the accessed entry using an egress port associated with the egress packet queue. In yet another aspect, the first network interface is configured to receive a network packet of the plurality of network packets at an ingress port of the network node.

Another embodiment provides a non-transitory, computer-readable storage medium embodying computer program code, the computer program code includes instructions executable by one or more modules of a network device configured to route network packets from an ingress network to one or more egress networks. The instructions are configured for: detecting depletion of available memory space in an internal memory of the network device, where the internal memory is associated with a packet processor, the internal memory stores network packet data from a plurality of network packets, and the network packet data is stored as entries of one or more egress packet queues; selecting an egress packet queue from which to evict one or more associated packets from the internal memory; selecting one or more packets associated with the selected egress packet queue for evicting from the internal memory; copying the selected packets to an external memory coupled to the packet processor; releasing internal memory resources associated with the copied packets; and accessing an entry from an egress packet queue where packet data for the entry is retrieved from one of the internal memory or external memory in response to previously copying the selected packets to the external memory.

In one aspect of the above embodiment, the instructions configured for selecting the egress packet queue further include instructions configured for selecting and egress port from which to evict packets where a first subset of the one or more egress packet queues are associated with the egress port, finding a lowest priority egress packet queue of the first subset of the one or more egress packet queues, and determining whether the selected egress packet queue includes packet entries consuming a sufficient amount of data in the internal memory to increase the available memory space in the internal memory above a second predetermined threshold.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/ dynamic load library and/or other sequence of instructions designed for execution on a computer system.

Some of the above embodiments, as applicable, may be implemented using a variety of different information processing systems. For example, although FIG. 2 and the discussion thereof describe an exemplary packet processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of network node 200 are circuitry located on a single integrated circuit or within a same device. Alternatively, network node 200 may include any number of separate integrated circuits or separate devices interconnected with each other. For example, XMU 240 may be located on a same integrated circuit as packet processor 215 or on a separate integrated circuit or located within another peripheral discretely separate from other elements of network node 200. Receive engine 210 and transmit engine 260 circuitry may also be located on separate integrated circuits or devices. Also for example, network node 200 or portions thereof may be soft or code representations of physical circuitry or of logical representations convertible into physical circuitry. As such, network node 200 may be embodied in a hardware description language of any appropriate type.

Furthermore, those skilled in the art will recognize that boundaries between the functionality of the above-described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of network node 200, for example, from computer-readable media such as internal memory 220, external memory 240, or other media accessible to the various modules such as queue manager 230, IMU manager 235, eviction dispatcher 250, and eviction engine 255. Such computer readable media may be permanently, removably or remotely coupled to a processing system such as network node 200. The computer-readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, differing egress queue selection criteria can be utilized to determine which packet data can be moved to the external queue memory space. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for storing and accessing queued packet data in a network device, the method comprising:
    detecting depletion of available memory space in an internal memory of the network device, wherein
        the internal memory is associated with a packet processor,
        the internal memory stores network packet data from a plurality of network packets, and
        the network packet data is stored as entries of one or more egress packet queues;
    selecting, in response to detecting depletion of the available memory space, an egress packet queue from which to evict one or more associated packets from the internal memory;
    selecting one or more packets associated with the selected egress packet queue for evicting from the internal memory;
    copying the one or more selected packets to an external memory coupled to the packet processor;
    releasing internal memory resources associated with the copied packets; and
    accessing an entry from an egress packet queue, wherein packet data for the entry is retrieved from one of the internal memory or external memory in response to previously copying the selected packets to the external memory.

2. The method of claim 1 wherein said detecting depletion of available memory space in the internal memory further comprises determining that available memory space in the internal memory is below a predetermined threshold.

3. The method of claim 1 wherein said selecting the egress packet queue further comprises:
    selecting an egress port from which to evict packets, wherein a first subset of the one or more egress packet queues are associated with the egress port;
    identifying a lowest priority egress packet queue of the first subset of the one or more egress packet queues; and
    determining whether the identified egress packet queue comprises packet entries consuming a sufficient amount of data in the internal memory to increase the available memory space in the internal memory above a predetermined threshold.

4. The method of claim 3 further comprising:
    identifying a next lowest priority egress packet queue of the first subset of the one or more egress packet queues in response to the identified egress packet queue not comprising packet entries consuming a sufficient amount of data in the internal memory to increase the available memory space in the internal memory above the predetermined threshold.

5. The method of claim 1 wherein said selecting the one or more packets associated with the selected egress packet queue for evicting from the internal memory further comprises:
    sequentially selecting one or more particular packet entries in the egress packet queue, wherein the one or more particular packet entries are more recently added to the egress packet queue than other packet entries in the egress packet queue;
    determining whether data associated with the one or more particular packet entries are stored in the internal memory;
    designating the one or more particular packet entries for eviction from the internal memory in response to the data associated with the one or more particular packet entries being stored in the internal memory;
    tracking a total amount of internal memory space freed by the one or more particular packet entries; and
    concluding said sequentially selecting in response to the total amount of internal memory space freed being above a threshold.

6. The method of claim 5, wherein each packet entry comprises a flag designating that the entry is stored in the internal memory.

7. The method of claim 5 wherein said designating the one or more particular packet entries for eviction from the internal memory further comprises revising identifiers associated with the one or more particular packet entries.

8. The method of claim 1 further comprising:
    transmitting the accessed entry using an egress port of the network device associated with the egress packet queue.

9. The method of claim 1 further comprising:
    receiving a network packet of the plurality of network packets at an ingress port of the network device.

10. A network node configured to route network packets from an ingress network to one or more egress networks, the network node comprising:
    a first network interface, coupled to the ingress network, and configured to receive a plurality of network packets from the ingress network;
    a second network interface, coupled to a first egress network of the one or more egress networks, and configured to transmit a network packet of the plurality of network packets to the first egress network;
    an internal memory, coupled to a packet processor, and configured to store network packet data from the plurality of network packets in one or more egress packet queues;
    an internal memory unit manager (IMU manager), coupled to the internal memory, and configured to detect depletion of available memory space in the internal memory;
    an eviction dispatcher module, coupled to the IMU manager and a queue manager module, and configured to select, in response to the IMU manager detecting depletion of available memory space, an egress packet queue from which to evict one or more associated packets from the internal memory, wherein said selecting the egress packet queue is performed in communication with the queue manager module, and select one or more packets associated with the selected egress packet queue for evicting from the internal memory, wherein said selecting the one or more packets is performed in communication with the queue manager module; and an eviction engine module, coupled to the internal memory and the eviction dispatcher module, and configured to receive identification of the selected one or more packets associated with the selected egress packet queue from the eviction dispatcher, copy the selected one or more packets to an external memory coupled to the eviction engine and the packet processor, and release internal memory resources associated with the copied packets subsequent to said copying to the external memory, wherein the second network interface accesses an entry from an egress packet queue, and packet data for the entry is retrieved from one of the internal memory or the external memory in response to previously copying the selected packets to the external memory.

11. The network node of claim 10, wherein the IMU manager detects the depletion of available memory space in the internal memory by being further configured to determine that the available memory space in the internal memory is below a predetermined threshold.

12. The network node of claim 10, wherein the eviction dispatcher module is configured to select the egress packet queue by being further configured to:

select an egress port from which to evict packets, wherein a first subset of the one or more egress packet queues are associated with the egress port;

identify a lowest priority egress packet queue of the first subset of the one or more egress packet queues; and determine whether the identified egress packet queue comprises packet entries consuming a sufficient amount of data in the internal memory to increase the available memory space in the internal memory above a predetermined threshold.

13. The network node of claim 12, wherein the eviction dispatcher module is further configured to:

identify a next lowest priority egress packet queue of the first subset of the one or more egress packet queues in response to the selected packet queue not comprising packet entries consuming a sufficient amount of data in the internal memory to increase the available memory space in the IMU above the predetermined threshold.

14. The network node of claim 10, wherein the eviction dispatcher module selects one or more packets associated with the egress packet queue by being further configured to:

sequentially select one or more particular packet entries in the egress packet queue, wherein the one or more particular packet entries are more recently added to the egress packet queue than other packet entries in the egress packet queue;

determine whether data associated with the one or more particular packet entries is stored in the internal memory;

designate the one or more particular packet entries for eviction from the internal memory in response to the data associated with the one or more particular packet entries being stored in the internal memory;

track a total amount of internal memory space freed by the one or more particular packet entries; and conclude said sequentially selecting in response to the total amount of internal memory space freed being above a threshold.

15. The network node of claim 14 wherein the one or more particular packet entries comprise flags designating that the one or more particular packet entries are stored in the internal memory.

16. The network node of claim 14 wherein the eviction dispatcher module designates the one or more particular packet entries for eviction from the internal memory by being further configured to revise one or more identifiers associated with the one or more particular packet entries.

17. The network node of claim 10 wherein the second network interface is configured to transmit the accessed entry using an egress port associated with the egress packet queue.

18. The network node of claim 10 wherein the first network interface is configured to receive a network packet of the plurality of network packets at an ingress port of the network node.

19. A non-transitory, computer-readable storage medium embodying computer program code, the computer program code comprising instructions executable by one or more modules of a network device configured to route network packets from an ingress network to one or more egress networks, the instructions configured for:

detecting depletion of available memory space in an internal memory of the network device, wherein
the internal memory is associated with a packet processor,
the internal memory stores network packet data from a plurality of network packets, and
the network packet data is stored as entries of one or more egress packet queues;

selecting, in response to detecting depletion of available memory space, an egress packet queue from which to evict one or more associated packets from the internal memory;

selecting one or more packets associated with the selected egress packet queue for evicting from the internal memory;

copying the selected one or more packets to an external memory coupled to the packet processor;

releasing internal memory resources associated with the copied packets; and accessing an entry from an egress packet queue, wherein packet data for the entry is retrieved from one of the internal memory or external memory in response to previously copying the selected packets to the external memory.

20. The non-transitory, computer-readable storage medium of claim 19, wherein the instructions configured for selecting the egress packet queue further comprise instructions configured for:

selecting an egress port from which to evict packets, wherein a first subset of the one or more egress packet queues are associated with the egress port;

identifying a lowest priority egress packet queue of the first subset of the one or more egress packet queues; and determining whether the identified egress packet queue comprises packet entries consuming a sufficient amount of data in the internal memory to increase the available memory space in the internal memory above a predetermined threshold.

\* \* \* \* \*